(12) United States Patent
Wu et al.

(10) Patent No.: US 12,403,967 B2
(45) Date of Patent: Sep. 2, 2025

(54) UNMANNED VEHICLE WITH SEPARABLE FUNCTIONAL MODULE

(71) Applicant: CHANGSHA XINGSHEN INTELLIGENT TECHNOLOGY CO., LTD, Hunan (CN)

(72) Inventors: Tongchao Wu, Hunan (CN); Xiangjing An, Hunan (CN)

(73) Assignee: CHANGSHA XINGSHEN INTELLIGENT TECHNOLOGY CO., LTD, Hunan (CN)

( * ) Notice: Subject to any disclaimer, the term of this patent is extended or adjusted under 35 U.S.C. 154(b) by 387 days.

(21) Appl. No.: 18/028,521

(22) PCT Filed: Sep. 22, 2021

(86) PCT No.: PCT/CN2021/119578
§ 371 (c)(1),
(2) Date: Mar. 25, 2023

(87) PCT Pub. No.: WO2022/063116
PCT Pub. Date: Mar. 31, 2022

(65) Prior Publication Data
US 2024/0025501 A1 Jan. 25, 2024

(30) Foreign Application Priority Data
Sep. 27, 2020 (CN) .......... 202011035689.3

(51) Int. Cl.
*B62D 63/02* (2006.01)
*B62D 33/077* (2006.01)

(52) U.S. Cl.
CPC ......... *B62D 63/025* (2013.01); *B62D 33/077* (2013.01)

(58) Field of Classification Search
None
See application file for complete search history.

(56) References Cited

U.S. PATENT DOCUMENTS 4,842,326 A * 6/1989 DiVito ............... B60P 3/42
296/10
7,455,312 B2 * 11/2008 Senatore ............ B62D 63/061
280/491.1
(Continued)

FOREIGN PATENT DOCUMENTS

| CN | 208036476 | 11/2018 |
| CN | 208429011 | 1/2019 |
| CN | 109533046 | 3/2019 |

(Continued)

OTHER PUBLICATIONS

"International Search Report (Form PCT/ISA/210) of PCT/CN2021/119578," mailed on Oct. 29, 2021, with English translation thereof, pp. 1-6.

*Primary Examiner* — Joseph D. Pape
(74) *Attorney, Agent, or Firm* — JCIPRNET (57) ABSTRACT

An unmanned vehicle with a separable functional module includes a functional module, a chassis for supporting the functional module, and a vehicle head mounted on the chassis, a locking mechanism connected to the functional module is disposed on the chassis or the vehicle head, and the functional module is combined with or separated from the chassis or the vehicle head through locking or unlocking of the locking mechanism.

9 Claims, 8 Drawing Sheets

(56) References Cited

U.S. PATENT DOCUMENTS 10,029,603 B2 * 7/2018 Stocks ................. B62D 63/025
10,479,427 B2 * 11/2019 Scaringe ................. B60K 1/04

FOREIGN PATENT DOCUMENTS

| | | | |
|---|---|---|---|
| CN | 109572531 | | 4/2019 |
| CN | 208722052 | * | 4/2019 |
| CN | 110758229 | * | 2/2020 |
| CN | 210882394 | * | 6/2020 |
| CN | 211087002 | | 7/2020 |
| CN | 112046642 | | 12/2020 |
| CN | 212447252 | | 2/2021 |
| CN | 212473229 | | 2/2021 |
| CN | 113120118 | | 7/2021 |
| CN | 113120119 | | 7/2021 |
| CN | 213799969 | | 7/2021 |
| CN | 214057370 | | 8/2021 |
| JP | 2005089005 | | 4/2005 |

* cited by examiner

UNMANNED VEHICLE WITH SEPARABLE FUNCTIONAL MODULE

CROSS-REFERENCE OF RELATED APPLICATION

This application is a 371 of international application of PCT application serial no. PCT/CN2021/119578, filed on Sep. 22, 2021, which claims the priority benefit of China application no. 202011035689.3, filed on Sep. 27, 2020. The entirety of each of the above-mentioned patent applications is hereby incorporated by reference herein and made a part of this specification.

TECHNICAL FIELD

The invention relates to intelligent vehicles, in particular to an unmanned vehicle with a separable functional module.

DESCRIPTION OF RELATED ART

Generally, the cargo box is fixedly connected to the chassis of existing unmanned delivery vehicles, so if cargoes in the cargo box cannot be taken away in time when the unmanned delivery vehicles reach the destination, the unmanned distribution vehicles have to wait, especially in case where the whole box of cargoes needs to be delivered to a fixed place, which reduces the delivery efficiency of the unmanned delivery vehicles. In order to fulfill high delivery efficiency, more unmanned delivery vehicles have to be used, and the operation cost is invisibly increased, which goes against the original intention of reducing the operation cost by using unmanned delivery vehicles.

With the rapid development of unmanned vehicles, unmanned street sweepers, unmanned sterilizing vehicles, unmanned sprinklers and unmanned sweepers emerge on the market. However, all these unmanned vehicles have only one function, and unmanned vehicles with some functions are used within specific time periods and are in the wait state in most time (for example, the sterilizing vehicles or the sprinklers generally work within fixed time periods), so the use efficiency of unmanned vehicles is reduced.

SUMMARY

The technical issue to be settled by the invention is to overcome the defects of the prior art by providing an unmanned vehicle with a separable functional module, which can improve the use efficiency and flexibility, and reduce the operation cost.

In order to solve the above problems, the present invention adopts the following technical solutions:

An unmanned vehicle with a separable functional module, comprising a functional module, a chassis for supporting the functional module, and a vehicle head mounted on the chassis, wherein a locking mechanism connected to the functional module is disposed on the chassis or the vehicle head, and the functional module is combined with or separated from the chassis or the vehicle head through locking and unlocking of the locking mechanism.

As further improvement of the above technical solution: limit grooves are formed at a top portion of the chassis, a pair of limit guide strips is disposed at a bottom of the functional module, and the limit guide strips are disposed in the limit grooves.

As further improvement of the above technical solution: the limit guide strips and the limit grooves are of an inverted right trapezoid structure, and right-angle sides of one pair of the limit guide strips are arranged opposite to each other.

As further improvement of the above technical solution: the locking mechanism comprises a locking seat mounted on the chassis or the vehicle head, a locking screw penetrating through the locking seat, and a locking nut disposed on the locking screw, a locking cavity allowing a head of the locking screw to rotate therein and a locking hole connected to the locking cavity are formed in the functional module, and the head of the locking screw is able to penetrate through the locking hole or press against a side edge of the locking hole.

As further improvement of the above technical solution: the locking hole and the head of the locking screw are of a kidney-shaped structure.

As further improvement of the above technical solution: two first stop blocks used for positioning the head of the locking screw are disposed on the locking seat and are oppositely disposed on two sides of the locking screw, wherein a second stop block is disposed at one end of one of the two first stop blocks, and another second stop block is disposed at the other end of the other one of the two first stop blocks.

As further improvement of the above technical solution: the functional module is a cargo box, an automatic vending cabinet module, a charger combination module, a firefighting module, a sterilization module, a sprinkling module or a sweeping module.

As further improvement of the above technical solution: mounting grooves are formed on two sides of a front end of the chassis, laser radars are disposed in the mounting grooves, a wheel track of a front wheel set of the chassis is less than that of a rear wheel set of the carrier, avoiding recesses are formed on two sides of the chassis and are located between the front wheel set and the rear wheel set, and the avoiding recesses are used for expanding a visual field of sensors.

As further improvement of the above technical solution: A lifting mechanism is disposed on the chassis.

As further improvement of the above technical solution: A travel mechanism is disposed on the functional module, and a guide mechanism for guiding the functional module to move onto or off from a vehicle body is disposed on the chassis.

Compared with the prior art, the invention has the following advantages:

1. Through the separable design of the chassis of the unmanned vehicle and the functional module on the chassis, the transport function of the unmanned vehicle is separated from the use function of the functional module, which lays a foundation for realize true unmanned operation of automatic loading and unloading of the functional module.
2. Through the separable design of the chassis of the unmanned vehicle and the functional module on the chassis, the functional module can be loaded and unloaded more flexibly, for example, the functional module can be loaded and unloaded in the front-back direction, the left-right direction and the vertical direction, so the functional module can be easily docked with various loading and unloading platforms.
3. Through the separable design of the chassis of the unmanned vehicle and the functional module on the chassis, when the unmanned vehicle is used as an unmanned delivery vehicle, a cargo box loaded on the vehicle can be separated from the vehicle at the destination, such that the unmanned vehicle can continue to perform other transport tasks without waiting, thus improving the delivery efficiency of the unmanned vehicle; when the unmanned vehicle is used as other functional modules such as an unmanned sterilization vehicle, a sterilization container is placed on the chassis of the unmanned vehicle, and in some usage scenarios such as a school, multiple functional modules can be disposed on one unmanned vehicle, and different functional modules are used at different time periods to complete different tasks, such that the universality of the unmanned vehicle is improved, the usage rate of the unmanned vehicle is increased, and the operation cost is reduced.

4. Two limit guide strips are disposed at the bottom of the functional module, and limit grooves matched with the limit guide strips are correspondingly formed on the chassis of the vehicle body, such that relative movement of the functional module on the vehicle body is limited; meanwhile, the limit guide strips are symmetrically disposed at the bottom of the functional module, and the cross-section of the limit guide strips is in an inverted right trapezoid shape, and two right-angle sides of the limit guide strips are arranged adjacent to each other, such that a cargo box can be prevented from shaking under the action of the two limit guide strips when lifted by the fork arms of a forklift.

5. Mounting grooves are formed on left and right sides of the front end of the unmanned vehicle, and laser radars for detecting the front-back direction and left-right direction of the vehicle body are mounted in the mounting groove, the wheel track of the front wheel set of the chassis is less than that of the rear wheel set of the chassis, and avoiding recesses are formed, so compared with the arrangement of protrusive brackets, omnidirectional detection is provided for the unmanned vehicle, the width of the unmanned vehicle can be decreased, such that the unmanned vehicle can adapt to narrow roads, and collisions between the protrusive brackets and obstacles are avoided.

DESCRIPTION OF THE EMBODIMENTS

The invention will be described in further detail below in conjunction with the accompanying drawings and specific embodiments.

FIG. 1 to FIG. 7 illustrate one embodiment of an unmanned vehicle with a separable functional module provided by the invention. In this embodiment, the unmanned vehicle with a separable functional module comprises a functional module 1, a chassis 2 for supporting the functional module 1, and a vehicle head 3 mounted on the chassis 2, wherein a locking mechanism 4 connected to the functional module 1 is disposed on the chassis 2. In other embodiments, the locking mechanism 4 may be disposed on the vehicle head 3, and the functional module 1 can be combined with or separated from the chassis 2 or the vehicle head 3 through locking and unlocking of the locking mechanism 4. Preferably, four locking mechanisms 4 are disposed at four corners of the chassis 2 respectively, such that the functional module 1 can be locked reliably; and operation windows 26 are disposed on the chassis 2 and are located on side faces of the locking mechanisms 4, and the locking mechanisms 4 can be operated through the operation windows 26 to realize locking and unlocking.

Figure 1:
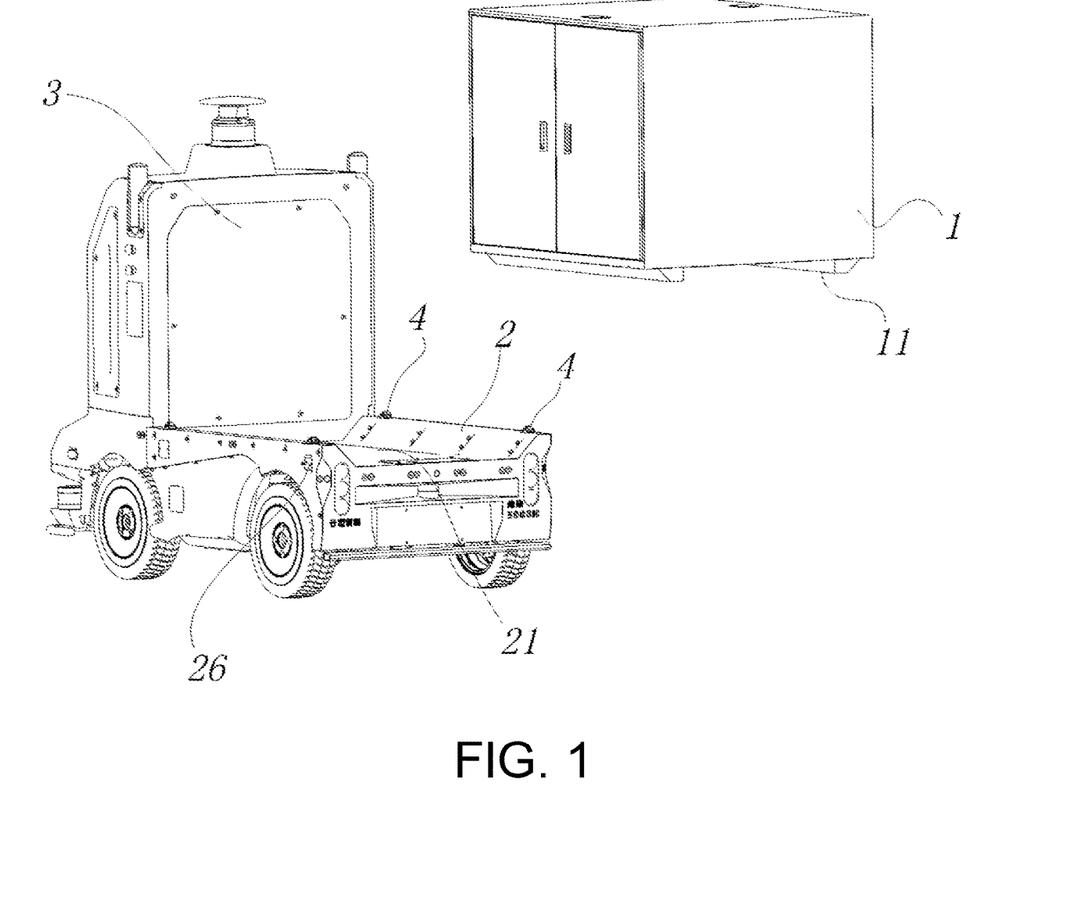
FIG. 1 is a three-dimensional structural schematic diagram of an unmanned vehicle with a separable functional module in a separated state according to the invention.
Figure 2:
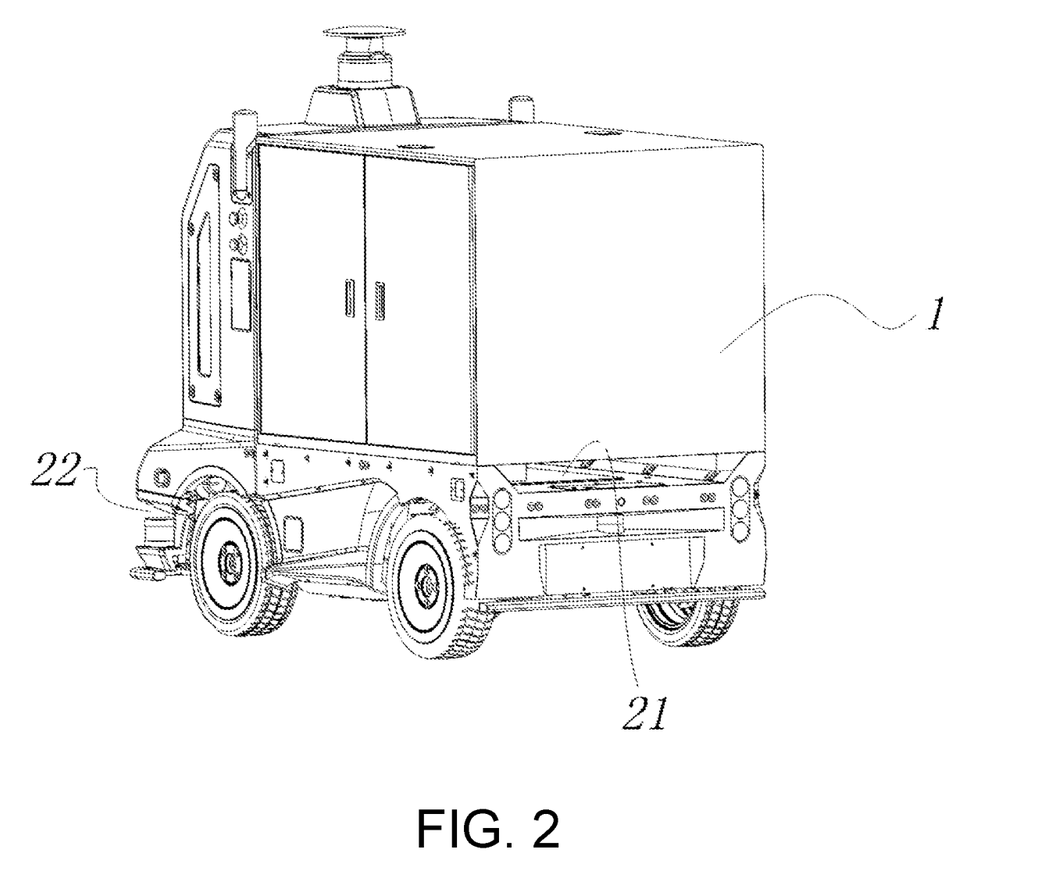
FIG. 2 is a three-dimensional structural schematic diagram of the unmanned vehicle with a separable functional module in a combined state according to the invention.
Figure 3:
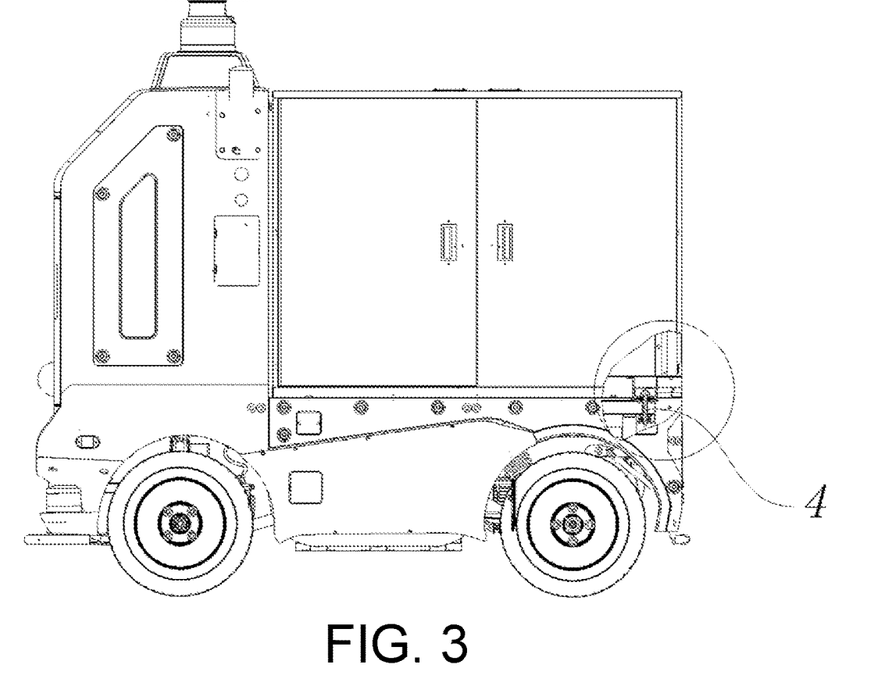
FIG. 3 is a front structural schematic diagram of the unmanned vehicle with a separable functional module in a combined state according to the invention.
Figure 4:
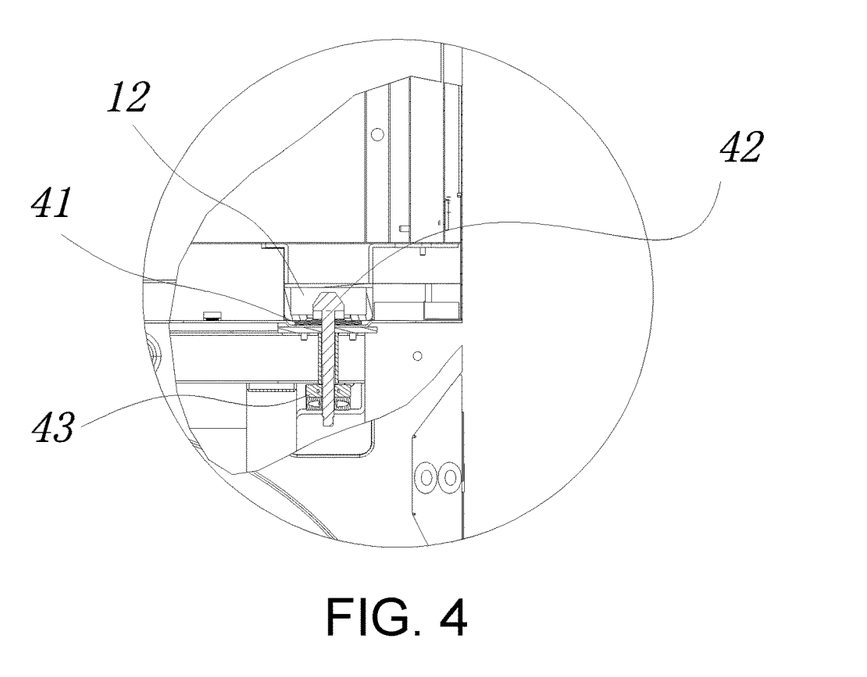
FIG. 4 is a partial enlarged view of FIG. 3.

The functional module 1 may be, for example, a cargo box, an automatic vending cabinet module, a charger combination module, a fire-fighting module, a sterilization module, a sprinkling module or a sweeping module. That is to say, corresponding modules can be used as the functional module 1 according to specific application occasions and requirements, to realize different functions. For example, when the automatic vending cabinet module is used as the functional module 1, an automatic vending machine may be mounted on the automatic vending cabinet module to realize automatic vending anytime and anywhere or in a cruise mode. For another example, the charger combination module may be used as the functional module 1, and in this case, the unmanned vehicle is equivalent to a mobile charging vehicle which can be used to charge other unmanned vehicles or equipment.

Figure 6:
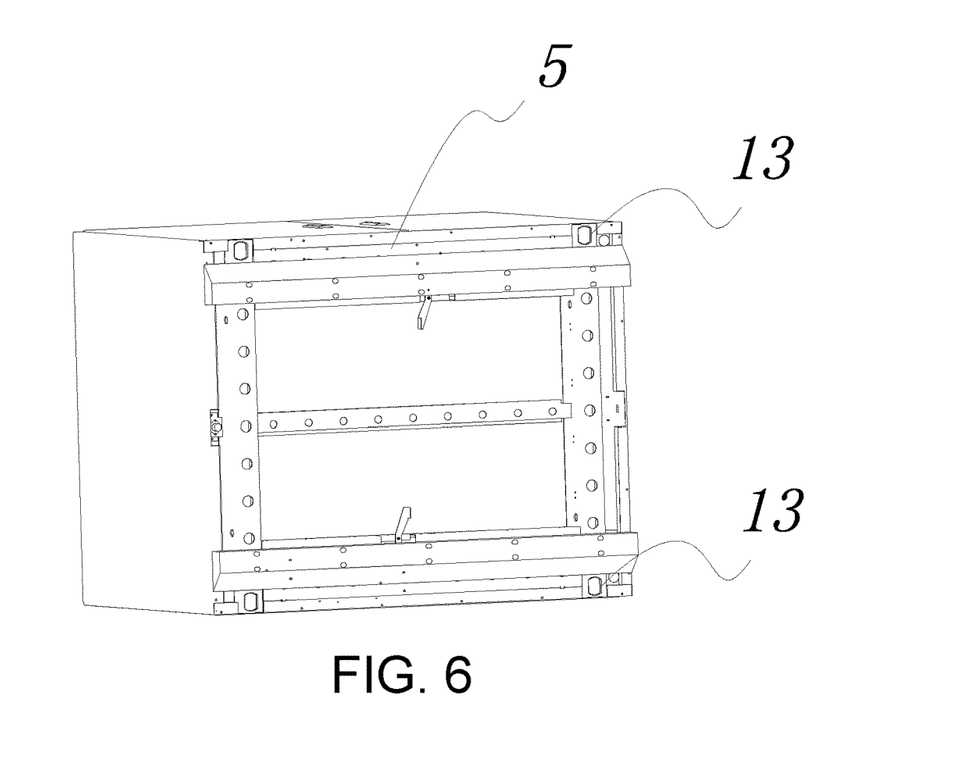
FIG. 6 is a structural schematic diagram of the bottom of a functional module according to the invention.
Figure 7:
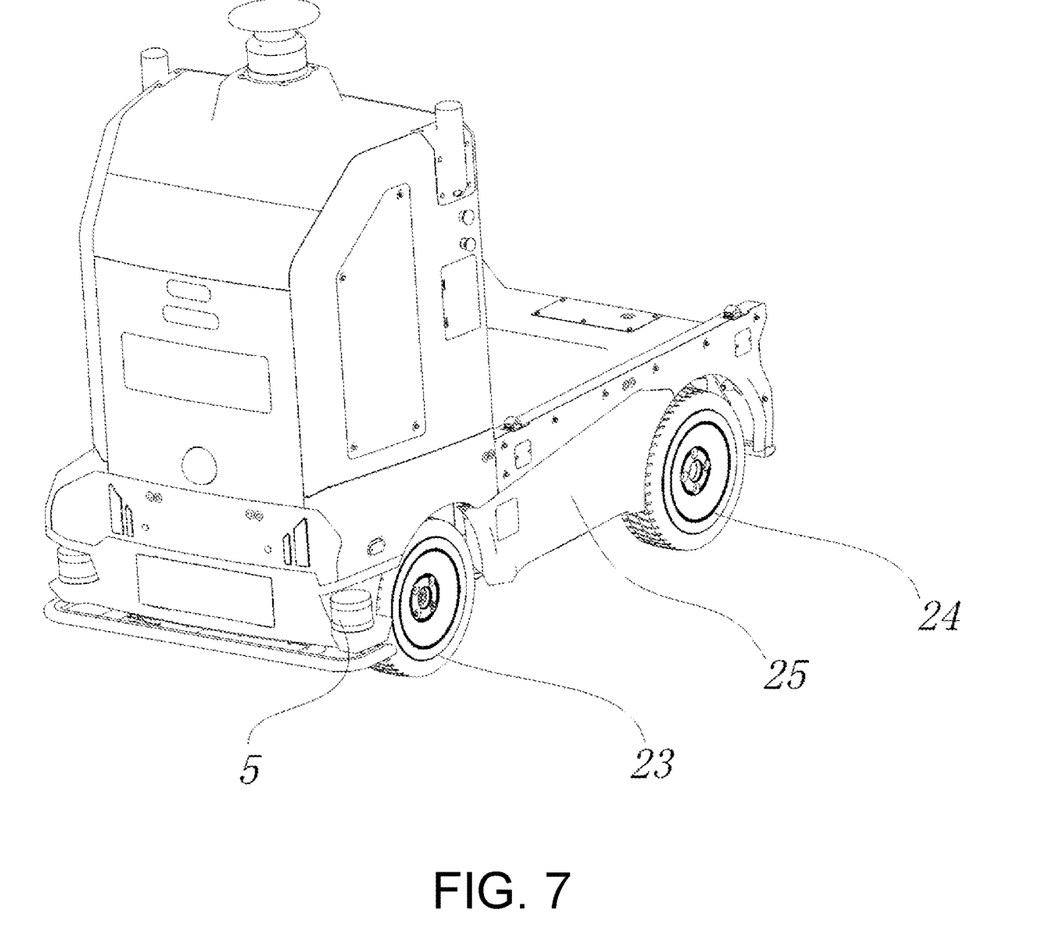
FIG. 7 is a three-dimensional structural schematic diagram of a chassis and a vehicle head according to the invention.

Further, in this embodiment, limit grooves 21 are formed at the top portion of the chassis 2, a pair of limit guide strips 11 is disposed at the bottom of the functional module 1, and the limit guide strips 11 are disposed in the limit grooves 21. Wherein, the limit grooves 21 and the limit guide strips 11 are arranged in a front-back direction (the side where the vehicle head 3 is located is defined as "front"), and the limit grooves 21 and the limit guide strips 11 are matched to limit the degree of freedom of the chassis 2 in a left-right direction; and when the functional module 1 is assembled on the chassis 2, the limit guide strips 11 on the functional module 1 can smoothly slide into the limit grooves 21 in the unmanned vehicle; and when the limit grooves 21 are placed on the ground, the functional module 1 can be transferred though a forklift.

In other embodiments, the limit grooves 21 and the pair of limit guide strips 11 may be arranged in the left-right direction.

Preferably, in this embodiment, the limit guide strips 11 and the limit grooves 21 are of an inverted right trapezoid structure, and right-angle sides of one pair of the limit guide strips 11 are arranged opposite to each other; or, the right-angle sides of one pair of limit guide strips 11 are arranged adjacent to each other; or, the right-angle sides are located on inner sides of the pair of limit guide strips 11.

Figure 5:
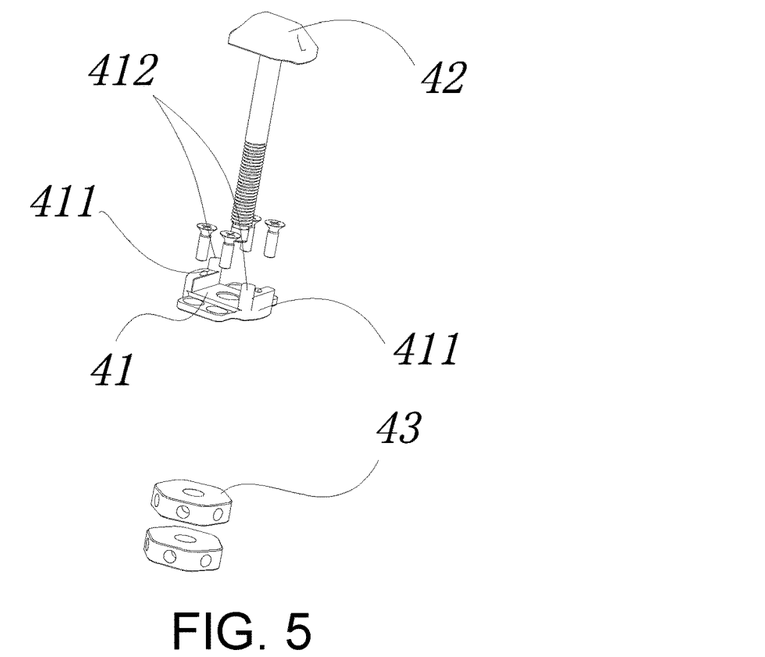
FIG. 5 is an exploded structural schematic diagram of a locking mechanism according to the invention.

In this embodiment, the locking mechanism 4 comprises a locking seat 41 mounted on the chassis 2, a locking screw 42 penetrating through the locking seat 41, and a locking nut 43 disposed on the locking screw 42, a locking cavity 12 allowing the head of the locking screw 42 to rotate therein and a locking hole 13 connected to the locking cavity 12 are formed in the functional module 1, and the head of the locking screw 42 is able to penetrate through the locking hole 13 or press against a side edge of the locking hole 13. Preferably, the locking hole 13 and the head of the locking screw 42 are of a kidney-shaped structure (similar to the head of a pin), such that a good guide effect and good stability can be realized. The locking seat 41 is of a plate-like structure and is mounted on the chassis 2 through threaded fasteners, two first stop blocks 411 used for positioning the head of the locking screw 42 are disposed on the locking seat 41, and the two first stop blocks 411 are oppositely disposed on two sides of the locking screw 42, wherein a second stop block 412 is disposed at one end of one of the two first stop blocks 411, and another second stop block 412 is disposed at the other end of the other one of the two first stop blocks 411, that is to say, the two second stop blocks 412 are arranged in a staggered manner; and the first stop blocks 411 and the second stop blocks 412 are preferably of an integrated structure. The locking mechanism 4 is high in reliability and capable of realizing locking and unlocking easily.

When the functional module 1 needs to be combined with the chassis 2, the functional module 1 is lifted by means of an auxiliary device such as a forklift. Specifically, fork arms of the forklift stretch into the space between the two limit guide strips 11 at the bottom of the functional module 1, and then the forklift lifts the functional module 1 until the limit guide strips 11 fit the limit grooves 21 in the chassis 2; next, the functional module 1 is placed on the chassis 2 from top to bottom, and in this process, and the head of the locking screw 42 slides to penetrate through the locking hole 13 in the bottom of the functional module 1 until the head of the locking screw 42 is combined with the second stop blocks 412 on the locking seat 41; when the functional module 1 is completely assembled on the chassis 2, the fork arms of the forklift retreat; the operation window 26 on the side edge of the chassis 2 is opened, the lower end of the locking screw 42 is tightened with a spanner, and the locking screw 42 is driven to rotate by 90°; then, the locking screw 42 is pulled downwards until the head of the locking screw 42 falls between the two first stop blocks 411, and at this moment, the head of the locking screw 42 presses against the side edge of the locking hole 13 in the bottom of the functional module 1; and finally, the locking nut 43 is rotated to lock the functional module 1 on the chassis 2, and the operation window 26 is closed.

The functional module 1 can be separated from the chassis 2 by performing the operation process reversely: first of all, the operation window 26 on the side edge of the chassis 2 is opened, the locking nut 43 is released, the locking screw 42 is pushed upwards and rotated by 90° to enable the head of the locking screw 42 to rise from the space between the two first stop blocks 411 onto the two first stop blocks 411 and cling to the second stop blocks 412 to be limited, and at this moment, the head of the locking screw 42 is separated from the locking hole 13 and designates from the locking hole 13; then, the fork arms of the forklift stretch into the limit grooves 21 in the chassis 2, and finally, the functional module 1 is lifted and transferred away by the forklift.

Further, in this embodiment, mounting grooves 22 are formed on two sides of the front end of the chassis 2, laser radars 5 are disposed in the mounting grooves 22, the wheel track of a front wheel set 23 of the chassis is less than that of a rear wheel set 24 of the chassis 2, avoiding recesses 25 are formed on two sides of the chassis 2 and are located between the front wheel set 23 and the rear wheel set 24, and the avoiding recesses 25 can provide a good vision space to expand the visual field of sensors, which makes it possible, to the maximum extent, to improve the precision of the sensors and expand the detection range of the sensors by optimizing the layout. The design of the avoiding recesses 25 breaks through the design bottleneck in sensor installation of all unmanned vehicles, and can guarantee safe travel of the unmanned vehicle. Compared with the arrangement of protrusive brackets, omnidirectional detection can be provided for the unmanned vehicle, and the width of the unmanned vehicle can be decreased, such that the unmanned vehicle can adapt to narrow roads and collisions between the protrusive brackets and obstacles are avoided.

Figure 8:
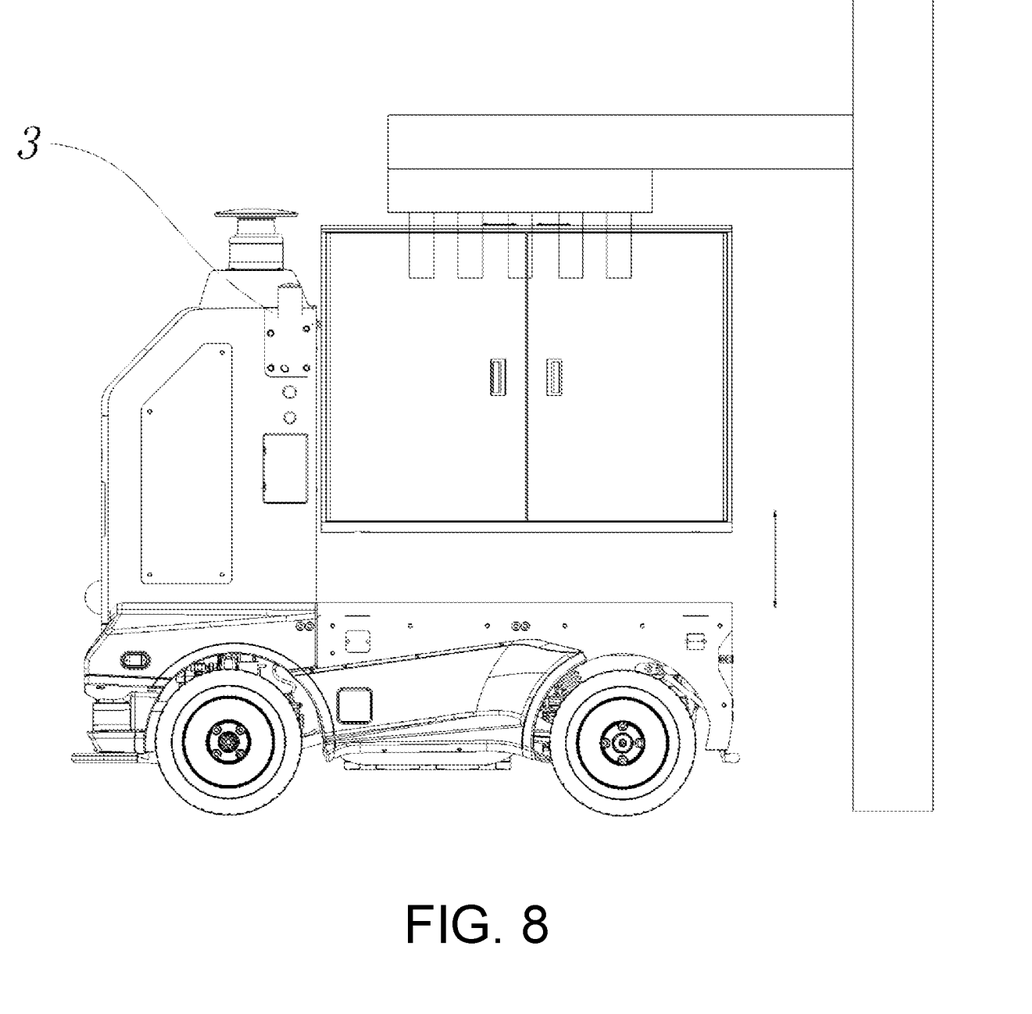
FIG. 8 is a structural schematic diagram of passive separation of the functional module according to the invention.

Referring to FIG. 8, in this embodiment, the functional module 1 is assembled on or detached from a vehicle body in the front-back direction through the forklift. In other embodiments, as an alternative solution, the functional module 1 may be assembled on or detached from the vehicle body in a vertical direction through a crane or a robot arm.

Figure 9:
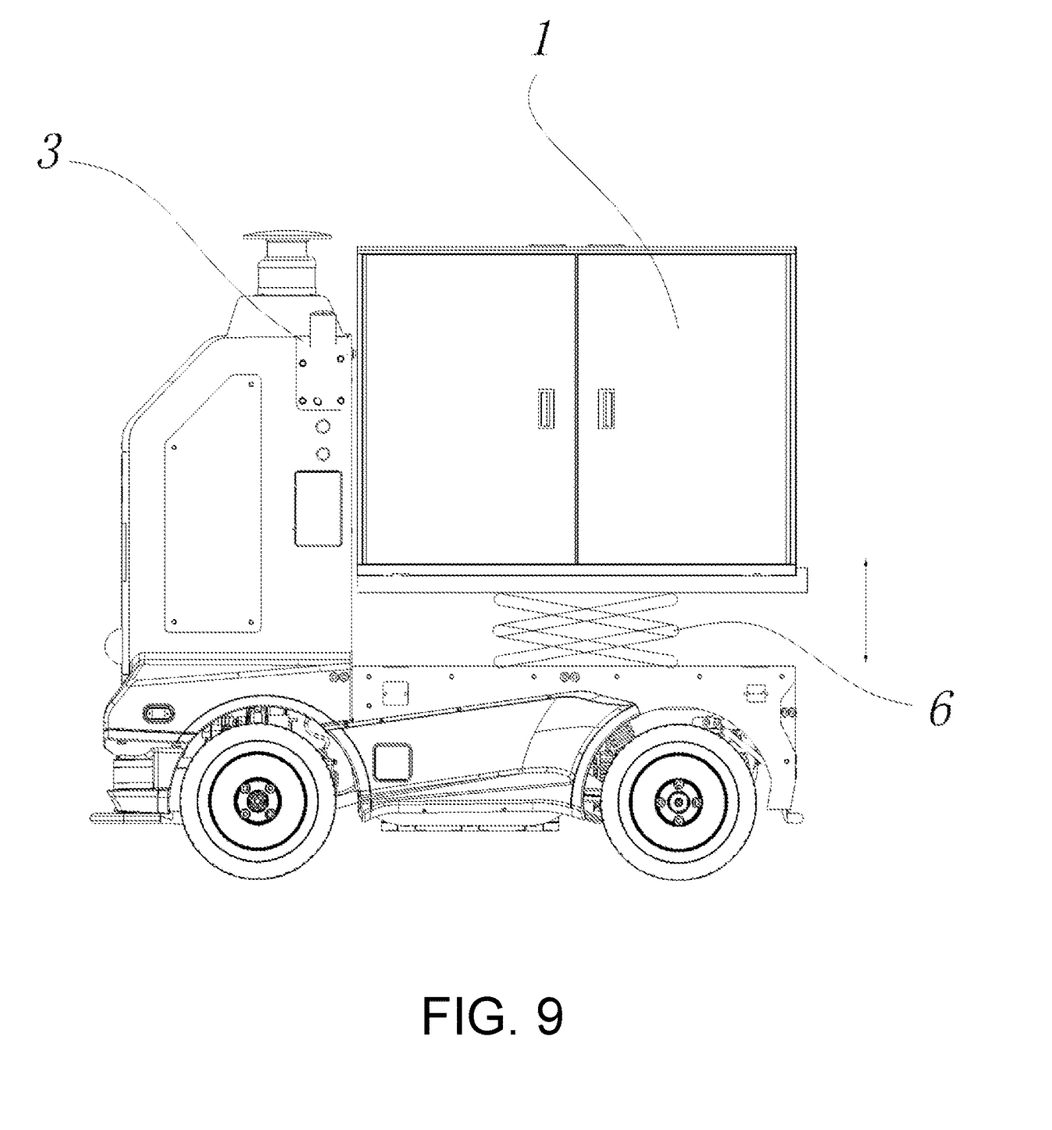
FIG. 9 is a structural schematic diagram of active separation of the functional module according to Embodiment 1 of the invention.

Referring to FIG. 9, in other embodiments, a lifting mechanism 6 may be disposed on the chassis 2 to realize active separation of the functional module 1, and the functional module 1 can be lifted by the lifting mechanism 6 to rise or fall vertically to be docked with an unloading platform.

Figure 10:
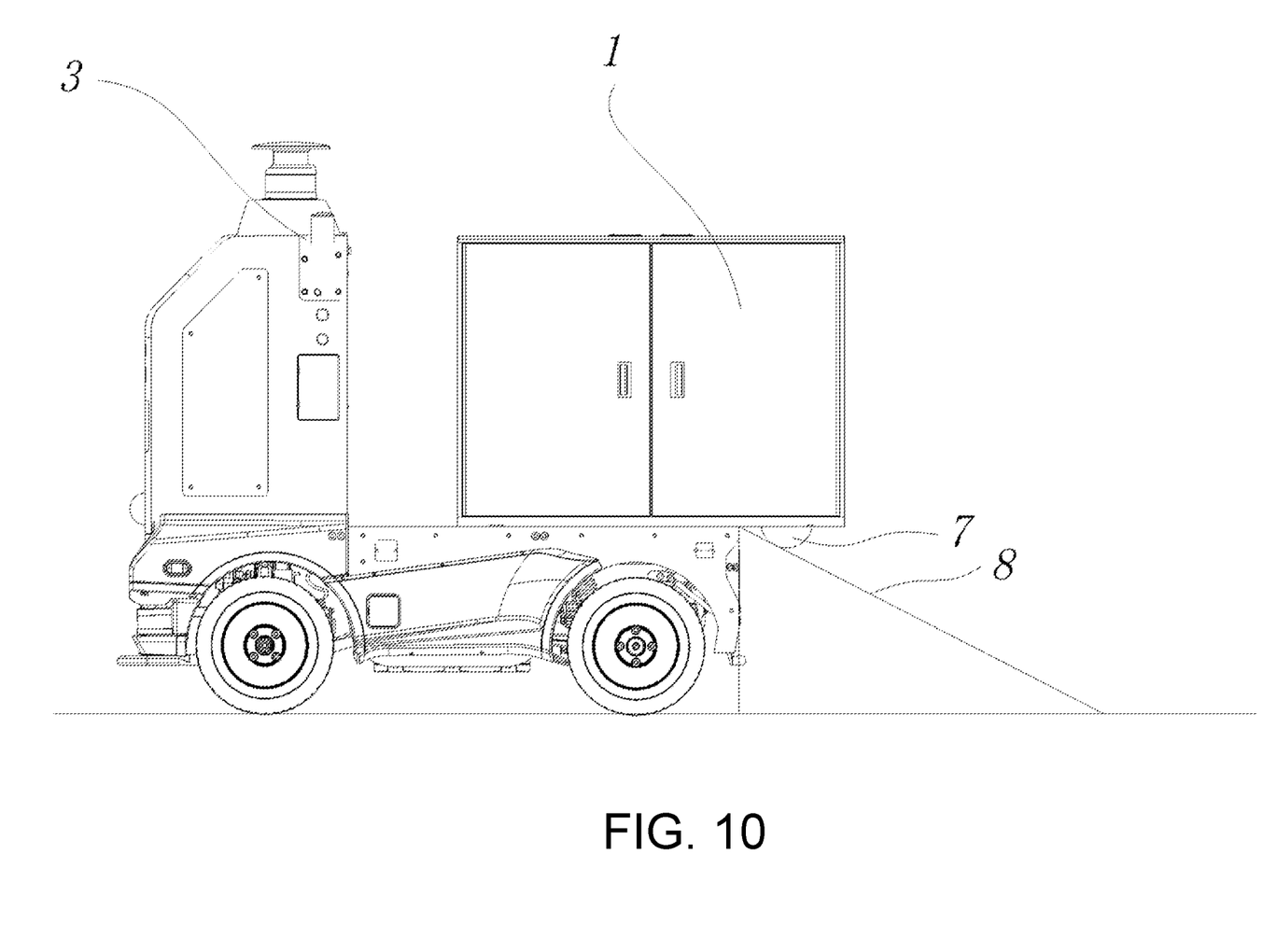
FIG. 10 is a structural schematic diagram of active separation of the functional module according to Embodiment 2 of the invention.

Referring to FIG. 10, as an alternative technical solution, in other embodiments, a travel mechanism 7 is disposed on the functional module 1, and a guide mechanism 8 for guiding the functional module 1 to move onto or off from the vehicle body is disposed on the chassis 2, and in this way, active separation of the vehicle body and the functional module 1 can also be realized.

Although the invention has been disclosed above with reference to preferred embodiments, these embodiments are not used to limit the invention. Any skilled in the art can make many possible changes and modifications to the technical solution of the invention or amend the above embodiments into equivalent embodiments according to the technical contents disclosed above without departing from the scope of the technical solution of the invention. Therefore, any simple amendments, equivalent changes and modifications made to the above embodiments according to the technical essence of the invention without departing from the contents of the technical solution of the invention should fall within the protection scope of the technical solution of the invention.

What is claimed is:

1. An unmanned vehicle with a separable functional module, comprising a functional module, a chassis for supporting the functional module, and a vehicle head mounted on the chassis, wherein a locking mechanism connected to the functional module is disposed on the chassis or the vehicle head, and the functional module is combined with or separated from the chassis or the vehicle head through locking or unlocking of the locking mechanism, wherein mounting grooves are formed on two sides of a front end of the chassis, laser radars are disposed in the mounting grooves, a wheel track of a front wheel set of the chassis is less than a wheel track of a rear wheel set of the chassis, avoiding recesses are formed on two sides of the chassis and are located between the front wheel set and the rear wheel set, and the avoiding recesses expands a visual field of sensors.

2. The unmanned vehicle with a separable functional module according to claim 1, wherein limit grooves are formed at a top portion of the chassis, a pair of limit guide strips is disposed at a bottom of the functional module, and the limit guide strips are disposed in the limit grooves.

3. The unmanned vehicle with a separable functional module according to claim 2, wherein the limit guide strips and the limit grooves are of an inverted right trapezoid structure, and right-angle sides of one pair of the limit guide strips are arranged opposite to each other.

4. The unmanned vehicle with a separable functional module according to claim 1, wherein the locking mechanism comprises a locking seat mounted on the chassis or the vehicle head, a locking screw penetrating through the locking seat, and a locking nut disposed on the locking screw, a locking cavity allowing a head of the locking screw to rotate in and a locking hole connected to the locking cavity are formed in the functional module, and the head of the locking screw penetrates through the locking hole or presses against a side edge of the locking hole.

5. The unmanned vehicle with a separable functional module according to claim 4, wherein the locking hole and the head of the locking screw are of a kidney-shaped structure.

6. The unmanned vehicle with a separable functional module according to claim 4, wherein two first stop blocks positioning the head of the locking screw are disposed on the locking seat and are oppositely disposed on two sides of the locking screw, a second stop block is disposed at one end of one of the two first stop blocks, and another second stop block is disposed at another end of the other one of the two first stop blocks.

7. The unmanned vehicle with a separable functional module according to claim 1, wherein the functional module is a cargo box, an automatic vending cabinet module, a charger combination module, a fire-fighting module, a sterilization module, a sprinkling module, or a sweeping module.

8. The unmanned vehicle with a separable functional module according to claim 1, wherein a lifting mechanism is disposed on the chassis.

9. The unmanned vehicle with a separable functional module according to claim 1, wherein a travel mechanism is disposed on the functional module, and a guide mechanism for guiding the functional module to move onto or off from a vehicle body is disposed on the chassis.

* * * * *